US011093657B2

(12) United States Patent
Bottomley et al.

(10) Patent No.: US 11,093,657 B2
(45) Date of Patent: Aug. 17, 2021

(54) LIMITED EXECUTION ENVIRONMENT FOR MONOLITHIC KERNEL

(71) Applicant: International Business Machines Corporation, Armonk, NY (US)

(72) Inventors: James Bottomley, Bellevue, WA (US); Joel Kelly Nider, Zichron Yaakov (IL); Michael Rapoport, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 16/416,227

(22) Filed: May 19, 2019

(65) Prior Publication Data

US 2020/0364375 A1   Nov. 19, 2020

(51) Int. Cl.
*G06F 21/00* (2013.01)
*G06F 21/74* (2013.01)

(52) U.S. Cl.
CPC ................... *G06F 21/74* (2013.01)

(58) Field of Classification Search
CPC ........................................................ G06F 21/74
See application file for complete search history.

(56) References Cited

U.S. PATENT DOCUMENTS

| 7,496,576 | B2 | 2/2009 | Bernabeu-Auban et al. |
| 8,627,451 | B2 | 1/2014 | Walsh et al. |
| 8,677,354 | B2 | 3/2014 | Peckham et al. |
| 2005/0226406 | A1 | 10/2005 | Forin |
| 2009/0133042 | A1* | 5/2009 | Forin ............... G06F 9/4411 |
| | | | 719/331 |
| 2012/0017213 | A1 | 1/2012 | Hunt et al. |
| 2017/0353498 | A1 | 12/2017 | Huang |
| 2018/0121649 | A1* | 5/2018 | Folco ............... G06F 21/554 |
| 2019/0004917 | A1 | 1/2019 | Gao |
| 2019/0068641 | A1* | 2/2019 | Araujo ............... G06F 21/54 |

OTHER PUBLICATIONS

International Search Report and the Written Opinion of the International Searching Authority, dated Aug. 10, 2020, in corresponding application PCT/EP2020/063608.

* cited by examiner

*Primary Examiner* — Joseph P Hirl
*Assistant Examiner* — Chi D Nguy
(74) *Attorney, Agent, or Firm* — Gregory J. Kirsch (57) ABSTRACT

Embodiments of the present systems and methods may provide additional security mechanisms inside an operating system kernel itself by isolating parts of the kernel to protect them from attacks. For example, in an embodiment, a computer-implemented method implemented in a computer comprising a processor, memory accessible by the processor, and computer program instructions stored in the memory and executable by the processor, the method may comprise: creating a namespace in an operating system kernel-space in the memory of the computer, creating an address space for the namespace that maps only kernel objects owned by the namespace, and providing access to kernel objects owned by the namespace only to the least one user process using the combined page table.

12 Claims, 5 Drawing Sheets

Fig. 1

Key Kernel Objects

LIMITED EXECUTION ENVIRONMENT FOR MONOLITHIC KERNEL

BACKGROUND

The present invention relates to techniques that provide additional security mechanisms inside an operating system kernel itself by isolating parts of the kernel to protect them from attacks.

The Linux operating system kernel is monolithic, meaning all of the code and data are linked together and there is no enforced separation between different parts of code or data. That means an exploitable bug in the interface may allow an attacker to gain unlimited access to kernel resources. Since bugs like this often appear, a need arises for a mechanism to restrict the damage that can be done from such an exploit. For example, assume there is an exploitable bug in a file system. If an attacker exploits the bug, he may gain access to other subsystems (such as the memory allocator, networking stack, scheduler, etc.) even though those subsystems do not contain an exploitable bug. This is due to the lack of security mechanisms inside the kernel itself, since the kernel is built as a single block of code.

Accordingly, a need arises for techniques that provide additional security mechanisms inside an operating system kernel itself.

SUMMARY

Embodiments of the present systems and methods may provide additional security mechanisms inside an operating system kernel itself by isolating parts of the kernel to protect them from attacks.

For example, in an embodiment, a computer-implemented method implemented in a computer comprising a processor, memory accessible by the processor, and computer program instructions stored in the memory and executable by the processor, the method may comprise: creating a namespace in an operating system kernel-space in the memory of the computer, creating an address space for the namespace that maps only kernel objects owned by the namespace, and providing access to kernel objects owned by the namespace only to the least one user process using the combined page table.

In embodiments, creating an address space for the namespace may comprise: generating a namespace page table comprising kernel-space mappings for kernel objects owned by the namespace and constructing a combined page table accessible to at least one user process comprising a user-space page table of the user process and the namespace page table. The operating system is the Linux operating system. The namespace is a namespace type selected from: a Mount namespace, a Process ID namespace, a Network namespace, an Interprocess Communication namespace, a UTS namespace, a User ID namespace, and a Control group namespace. The method may further comprise destroying the namespace by destroying the combined page table, the namespace page table, and the kernel object owned by the namespace.

In an embodiment, a system may comprise a processor, memory accessible by the processor, and computer program instructions stored in the memory and executable by the processor to perform: creating a namespace in an operating system kernel-space in the memory of the computer, creating an address space for the namespace that maps only kernel objects owned by the namespace, and providing access to kernel objects owned by the namespace only to the least one user process using the combined page table.

In an embodiment, a computer program product may comprise a non-transitory computer readable storage having program instructions embodied therewith, the program instructions executable by a computer, to cause the computer to perform a method comprising: creating a namespace in an operating system kernel-space in the memory of the computer, creating an address space for the namespace that maps only kernel objects owned by the namespace, and providing access to kernel objects owned by the namespace only to the least one user process using the combined page table.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide additional security mechanisms inside an operating system kernel itself by isolating parts of the kernel to protect them from attacks.

A namespace is a domain of kernel objects that are logically grouped together to serve a set of processes. The primary purpose of the namespace is to allow the same object name to be reused across namespaces, while addressing different kernel objects. That is, a namespace is a construct inside a kernel that may be used to avoid name collisions in user-space. For example, in a particular 'user' namespace, usernames must be unique. However, the same username may be reused across different user namespaces. This is the same concept for pid namespaces (separation by process ID), network namespaces (separation by network device name), etc. Currently, all data objects belonging to all namespaces are mapped in memory, regardless of the current namespace that is in use. This potentially allows access of the wrong object by exploiting a bug in the interface.

Embodiments of the present systems and methods may provide a security mechanism that can isolate certain parts of the kernel, and protect them from attacks attempting to access an object from a different namespace. Embodiments may provide multiple address spaces inside the kernel, and may isolate kernel objects at the level of a namespace. Each namespace may have its own address space and will map only the kernel objects owned by that namespace.

In embodiments, when an object is required that resides outside of the current namespace (for example, when performing a memory allocation inside the network stack) an IPC (inter-process communication) mechanism may be used.

Figure 1:
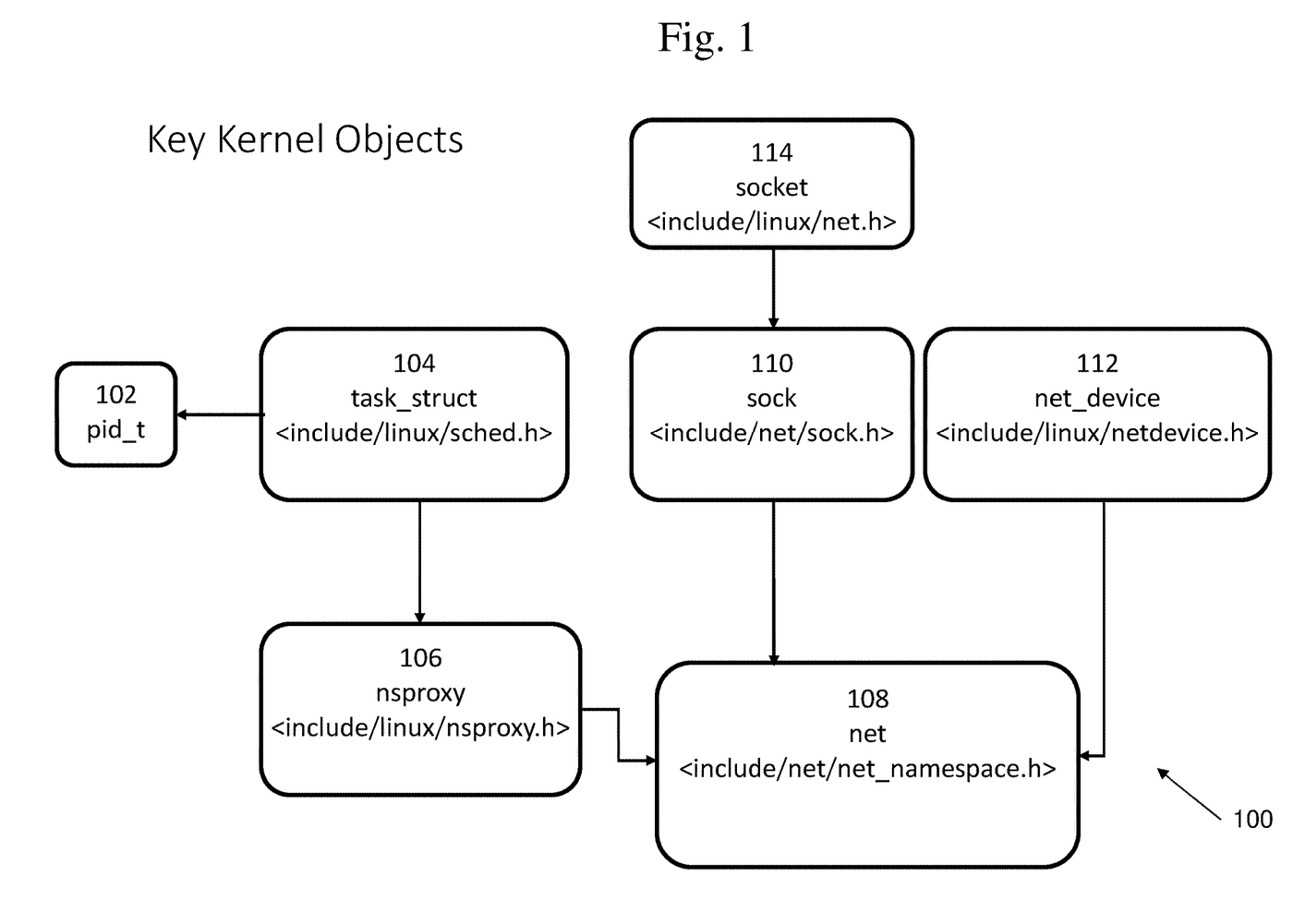
FIG. 1 is an exemplary block diagram of key objects in an operating system kernel, such as a Linux kernel.

An exemplary block diagram of key objects in an operating system kernel 100, such as a Linux kernel, is shown in FIG. 1. In this example, kernel 100 may include a process ID 102, a task structure 104, nsproxy 106, network namespace 108, sock layer 110, network device 112, and socket layer 114. Process ID 102 may be a numerical value, represented by the data type pid_t, which may uniquely identify each process for the system. Task structure 104 may be a process descriptor of the type task_struct (defined in <linux/sched.h>) and may be an element in the task list. Each task structure 104 may contain information about a specific process or thread that is running, such as the process identified by process ID 102. Task structure 104 points to an associated network namespace, such as network namespace 108.

Socket 114 is a file descriptor that points to a network connection for inter-process communication, which may be communication of any type—within the kernel, between user processes, between different machines, etc. There are a number of different kinds of sockets, and different types of sockets may use different communication protocols. In this example, socket 114 is a generic representation of the different kinds of sockets and may interact with the user space directly through the system interface. Socket 114 may point to a type of intermediate interface, sock 110, and sock 110 points to an instance of a network namespace 108. Network namespace 108 may separate other kernel objects, such as task structure 104, socket layer 114, sock layer 110, and network device 112, into a logical group. Anytime kernel code is interacting with a particular socket, such as socket 114, that kernel code must be in the associated network namespace, such as network namespace 108, or in the default namespace.

Network device 112 represents any particular network hardware or interface. For example, user space code may access a network device 112 using a device name such as "eth0". In the kernel space, eth0 would point to network device 112, which also belongs to a particular network namespace 108. This mechanism provides the capability to isolate which user processes have access to which devices. Likewise, any code that runs on behalf of the process associated with task structure 104 points to an associated network namespace, such as network namespace 108, and that code then runs on behalf of that network namespace.

In embodiments, when any code that runs on behalf of the process associated with task structure 104, associated with network namespace 108, attempts to access an object, embodiments may ensure that that object also belongs to the same network namespace 108. This provides isolation of the object from user processes, as the address space of network namespace 108 is separate. It is to be noted that the description of embodiments of the present systems and methods is provided with reference to a network namespace. However, this is only an example. Operating system kernels, such as the Linux kernel, may utilize a number of different types of namespaces, and embodiments of the present systems and methods are equally applicable to those other types of namespaces as well. Examples of types of namespaces to which the present systems and methods may be applicable include: Mount (mnt) namespace—mount namespaces control mount points; Process ID (pid) namespace—the PID namespace provides processes with an independent set of process IDs (PIDs) from other namespaces; Network (net) namespace—network namespaces virtualize the network stack; Interprocess Communication (ipc) namespace—IPC namespaces isolate processes from SysV style inter-process communication; UTS namespace—UTS namespaces allow a single system to appear to have different host and domain names to different processes; User ID (user) namespace—user namespaces provide both privilege isolation and user identification segregation across multiple sets of processes; Control group (cgroup) namespace—the cgroup namespace type hides the identity of the control group of which process is a member, etc.

Figure 2:
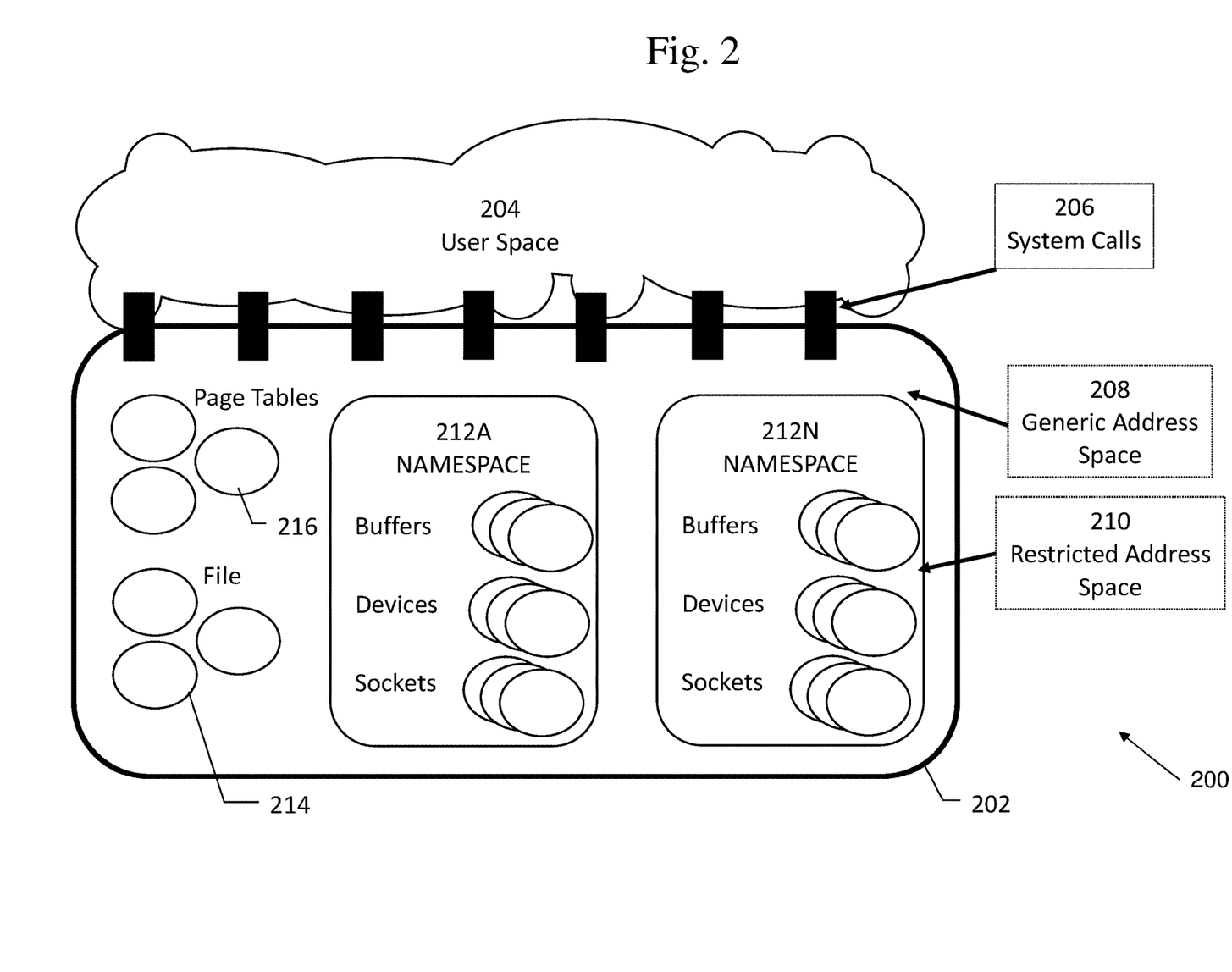
FIG. 2 is an exemplary block diagram of a kernel structure, according to embodiments of the present systems and methods.

An exemplary block diagram of a kernel structure 200, according to embodiments of the present systems and methods, is shown in FIG. 2. In this example, structure 200 may include kernel-space 202 and user-space 204. Kernel-space 202 may include code and data that resides in an elevated system state, and which may include a protected memory space and full access to the hardware. User-space 204 may include user applications, which may execute with reduced privileges, in which they can access only a subset a subset of the available resources of the hardware and software. Applications in user-space 204 cannot directly perform certain system functions, directly access hardware, access memory outside of that allotted them by the kernel, etc. In order for applications in user-space 204 to access other system resources, an application may make system calls 206, in order to request the kernel to perform certain functions for the application.

As shown in FIG. 2, kernel space 202 may include generic address space 208 and restricted address space 210. Generic address space 208 may include generic kernel resources, such as page tables 216, files 214, etc. Restricted address space 210 may include a plurality of namespaces 212A-N. Each namespace 212A-N is an address space that is linked to a particular namespace and each protects a number of sub-kernel object within, such as device, network sockets, and the associated buffers, etc. In embodiments, in order to provide an address space to each namespace 212A-N, the memory of each namespace in the kernel may be reorganized so that objects owned by different namespaces may be mapped in separate memory pages/regions. When the namespace, such as namespace 212A, is created, an address space (memory page directory) that belongs to that specific namespace may also be created. All kernel data objects that are mapped in the address space of namespace 212A belong to namespace 212A. Each time a system call 206 is invoked that acts on data objects from a particular namespace, such as namespace 212A, the address space of that namespace must be activated. When the namespace is destroyed, the address space is also destroyed, along with all of the mapped kernel objects.

Kernel code that acts on data objects that belong to a namespace, such as namespace 212A must all be mapped in the address space of namespace 212A. Other kernel code, such as functions that cannot be called from inside the namespace, should not be mapped, as it is not possible to access data objects that are not mapped.

Figure 3:
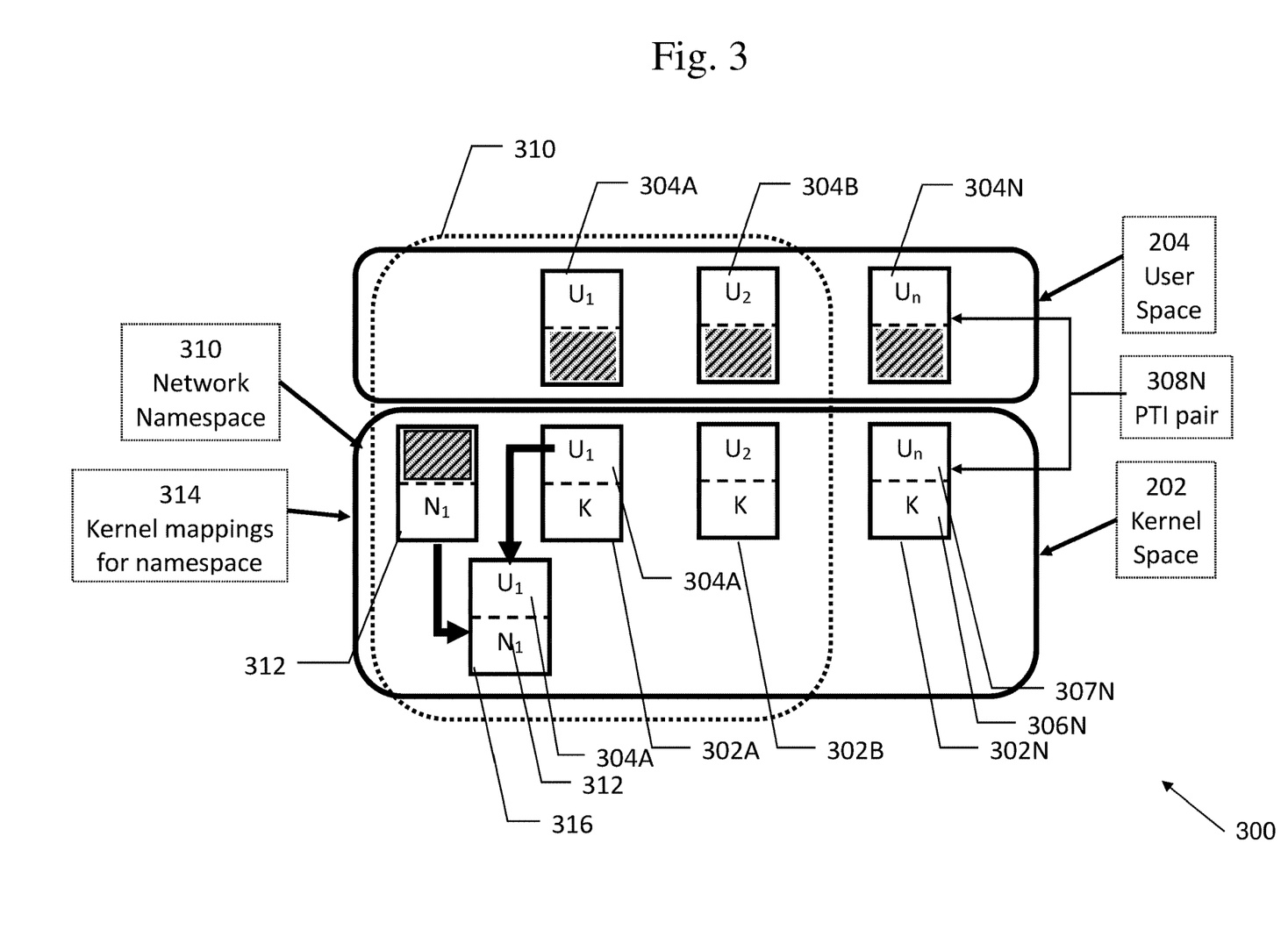
FIG. 3 is an exemplary block diagram of a page table implementation that may be used by embodiments of the present systems and methods.

An example of a page table implementation that may be used by embodiments of the present systems and methods is shown in FIG. 3. Current versions of, for example, the Linux kernel include a feature known as kernel page-table isolation (PTI) in order to mitigates certain security vulnerabilities and improve kernel security. PTI separating user-space and kernel-space page tables entirely. For example, user-space page table 304N contains user-space address mappings and a minimal set of kernel-space mappings to provide for system calls, interrupts, and exceptions. Kernel-space page table 302N includes both kernel-space 306N and user-space 307N address mappings, but it is only used when the system is running in kernel mode. Together user-space page table 304N and kernel-space page table 302N form a PTI pair 308N. As shown in this example, user-space page tables 302A-N may be established for each user process in user-space 204 and kernel-space page tables 304A-N may be established for each user process in kernel space 202.

In embodiments, the page tables may be isolated by mapping them based on namespaces using an additional page table per namespace. For example, as shown in FIG. 3, a network namespace 310 may be associated with a namespace kernel page table 312 that is isolated to that namespace. Kernel mappings for that namespace may be established in kernel page table 312. For example, when a task runs within namespace 310 and attempts to access an object, the task may not use the conventional kernel page table 304A/302A for the process, but rather, may use a new page table constructed from the user portion 304A kernel page table 304A/302A and the kernel portion from the namespace kernel page table 312 to form kernel-space page table 316 that is isolated to namespace 310. Kernel-space page table 316 may then provide access to all objects belonging to the namespace, and all generic objects, and in addition, may provide access to the user objects and user code for that particular task.

In embodiments, an address space, such as memory page table 312 may be created for a namespace 310 when namespace 310 is initially created. When a user-space process or task, such as user process/task 304A requests to perform actions on kernel objects, the address space, page table 312, of namespace 310 that owns those objects may be activated and it may be ensured that only those kernel objects owned by namespace 310 are mapped in page tables 316 available to the user-space process/task 304. When namespace 310 is destroyed, page tables 316 may be destroyed along with all the mapped kernel objects.

Figure 4:
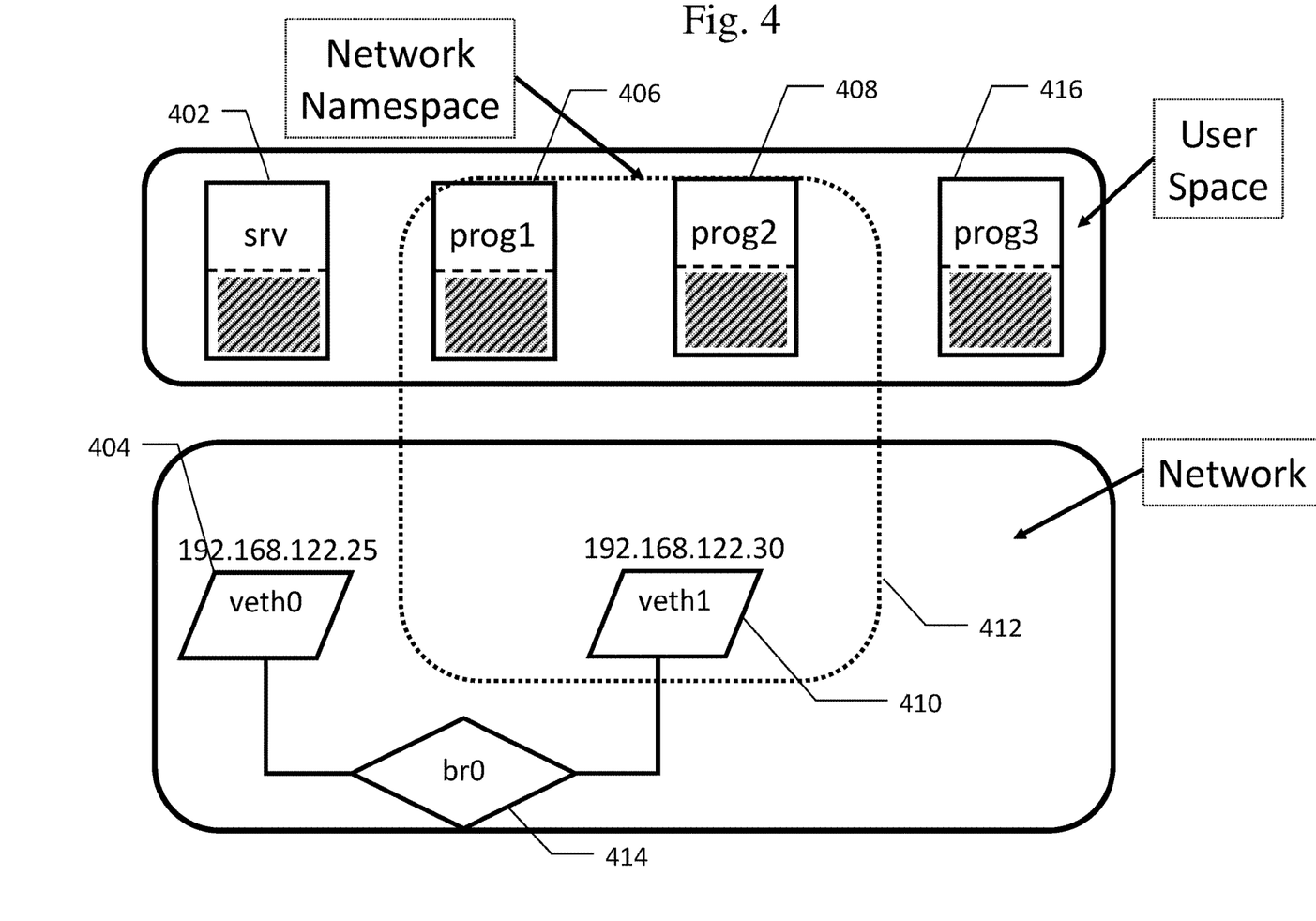
FIG. 4 is an exemplary block diagram of a test implementation of embodiments of the present systems and methods.

An exemplary test implementation of embodiments of the present systems and methods is shown in FIG. 4. In this example, srv 402, a TCP/IP server program, may listen on a particular TCP/IP port, veth0 404, which belongs to the default namespace. User space programs, prog1 406 and prog2 408, may be TCP clients connected to port veth1 410. User space programs prog1 406 and prog2 408 may run inside a particular network namespace 412, which means that prog1 406 and prog2 408 are associated with task structures that point to namespace 412. Port veth1 410 may be an instance of a network device that also belongs to namespace 412. Accordingly, only prog1 406 and prog2 408 may use port veth1 410. Port veth1 410 may be connected over a bridge, br0 414, to veth0 404, which belongs to the default namespace and is outside namespace 412. Thus, prog1 406 may open a TCP socket to connect to a server, srv 402, which is outside namespace 412. Prog2 408 may be passed that TCP socket and may still use it to connect to srv 402, since the TCP socket is inside namespace 412. However, if the TCP socket is passed, for example to prog3 416, which is outside namespace 412, as prog3 416 will not have access to both that socket and veth1 410, prog3 416 will not be able to connect to srv 402 using that socket or veth1 410.

Figure 5:
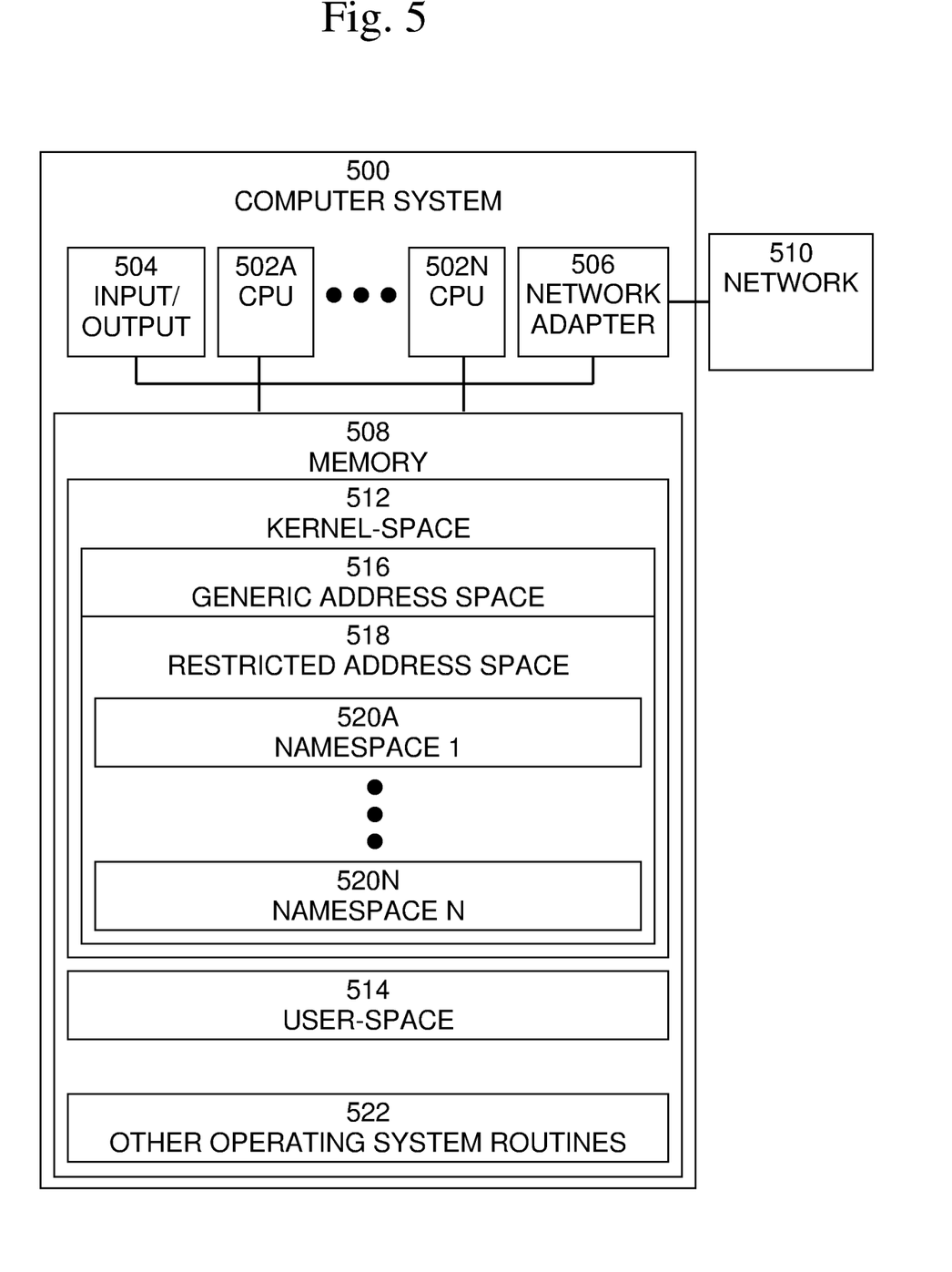
FIG. 5 is an exemplary block diagram of a computer system, in which processes involved in the embodiments described herein may be implemented.

An exemplary block diagram of a computer system 500, in which processes involved in the embodiments described herein may be implemented, is shown in FIG. 5. Computer system 500 may be implemented using one or more programmed general-purpose computer systems, such as embedded processors, systems on a chip, personal computers, workstations, server systems, and minicomputers or mainframe computers, or in distributed, networked computing environments. Computer system 500 may include one or more processors (CPUs) 502A-502N, input/output circuitry 504, network adapter 506, and memory 508. CPUs 502A-502N execute program instructions in order to carry out the functions of the present communications systems and methods. Typically, CPUs 502A-502N are one or more microprocessors, such as an INTEL CORE® processor. FIG. 5 illustrates an embodiment in which computer system 500 is implemented as a single multi-processor computer system, in which multiple processors 502A-502N share system resources, such as memory 508, input/output circuitry 504, and network adapter 506. However, the present communications systems and methods also include embodiments in which computer system 500 is implemented as a plurality of networked computer systems, which may be single-processor computer systems, multi-processor computer systems, or a mix thereof.

Input/output circuitry 504 provides the capability to input data to, or output data from, computer system 500. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 506 interfaces device 500 with a network 510. Network 510 may be any public or proprietary LAN or WAN, including, but not limited to the Internet.

Memory 508 stores program instructions that are executed by, and data that are used and processed by, CPU 502 to perform the functions of computer system 500. Memory 508 may include, for example, electronic memory devices, such as random-access memory (RAM), read-only memory (ROM), programmable read-only memory (PROM), electrically erasable programmable read-only memory (EE-PROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 508 may vary depending upon the function that computer system 500 is programmed to perform. In the example shown in FIG. 5, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 5, memory 508 may include kernel-space 512, user-space 514, and other operating system routines 522. Kernel-space 202 may include code and data that resides in an elevated system state, and which may include a protected memory space and full access to the hardware. Kernel-space 202 may include generic address space 516, and restricted address space 518. Generic address space 516 may include generic kernel resources, such as page tables, files, etc. Restricted address space 518 may include a plurality of namespaces 520A-N. Each namespace 520A-N is an address space that is linked to a particular namespace and each protects a number of sub-kernel object within, such as device, network sockets, and the associated buffers, etc. User-space 514 may include user applications, which may execute with reduced privileges, in which they can access only a subset a subset of the available resources of the hardware and software. Other operating system routines 522 may provide additional system functionality.

As shown in FIG. 5, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method implemented in a computer comprising a processor, memory accessible by the processor, and computer program instructions stored in the memory and executable by the processor, the method comprising:
   creating a namespace in an operating system kernel-space in the memory of the computer;
   creating an address space for the namespace that maps only kernel objects owned by the namespace by:
      generating a namespace page table comprising kernel-space mappings for kernel objects owned by the namespace, and
      constructing a combined page table accessible to at least one user process comprising a user-space page table of the user process and the namespace page table; and
   providing access to kernel objects owned by the namespace only to the least one user process using the combined page table.

2. The method of claim 1, wherein the operating system is a Linux operating system.

3. The method of claim 2, wherein the namespace is a namespace type selected from: a Mount namespace, a Process Identifier (ID) namespace, a Network namespace, an Interprocess Communication namespace, a UNIX Time-Sharing (UTS) namespace, a User Identifier (ID) namespace, and a Control group namespace.

4. The method of claim 1, further comprising destroying the namespace by destroying the combined page table, the namespace page table, and the kernel object owned by the namespace.

5. A system comprising a processor, memory accessible by the processor, and computer program instructions stored in the memory and executable by the processor to perform:
   creating a namespace in an operating system kernel-space in the memory of the computer;
   creating an address space for the namespace that maps only kernel objects owned by the namespace by:
      generating a namespace page table comprising kernel-space mappings for kernel objects owned by the namespace, and
      constructing a combined page table accessible to at least one user process comprising a user-space page table of the user process and the namespace page table; and
   providing access to kernel objects owned by the namespace only to the least one user process using the combined page table.

6. The system of claim 5, wherein the operating system is a Linux operating system.

7. The method of claim 6, wherein the namespace is a namespace type selected from: a Mount namespace, a Process Identifier (ID) namespace, a Network namespace, an Interprocess Communication namespace, a UNIX Time-Sharing (UTS) namespace, a User Identifier (ID) namespace, and a Control group namespace.

8. The system of claim 5, further comprising destroying the namespace comprising destroying the combined page table, the namespace page table, and the kernel object owned by the namespace.

9. A computer program product comprising a non-transitory computer readable storage having program instructions embodied therewith, the program instructions executable by a computer, to cause the computer to perform a method comprising:
   creating a namespace in an operating system kernel-space in the memory of the computer;
   creating an address space for the namespace that maps only kernel objects owned by the namespace by:
      generating a namespace page table comprising kernel-space mappings for kernel objects owned by the namespace, and
      constructing a combined page table accessible to at least one user process comprising a user-space page table of the user process and the namespace page table; and
   providing access to kernel objects owned by the namespace only to the least one user process using the combined page table.

10. The computer program product of claim 9, wherein the operating system is a Linux operating system.

11. The computer program product of claim 10, wherein the namespace is a namespace type selected from: a Mount namespace, a Process Identifier (ID) namespace, a Network namespace, an Interprocess Communication namespace, a UNIX Time-Sharing (UTS) namespace, a User Identifier (ID) namespace, and a Control group namespace.

12. The computer program product of claim 9, further comprising destroying the namespace comprising destroying the combined page table, the namespace page table, and the kernel object owned by the namespace.

* * * * *